United States Patent [19]

Kaneko et al.

[11] Patent Number: 5,418,575
[45] Date of Patent: May 23, 1995

[54] COLOR DISPLAY APPARATUS HAVING COMPENSATING UNIT

[75] Inventors: Atsushi Kaneko, Chigasaki; Hideaki Ohki, Fujisawa; Akio Nakashima, Yokohama; Junichi Ikoma, Yokosuka, all of Japan

[73] Assignee: Hitachi, Ltd., Tokyo, Japan

[21] Appl. No.: 202,218

[22] Filed: Feb. 25, 1994

Related U.S. Application Data

[63] Continuation-in-part of Ser. No. 988,667, Dec. 10, 1992, Pat. No. 5,319,448.

[30] Foreign Application Priority Data

Feb. 26, 1993 [JP] Japan ................... 5-037818

[51] Int. Cl.⁶ ............................................. H04N 9/64
[52] U.S. Cl. ................................. 348/645; 348/649; 348/727
[58] Field of Search ............... 348/645, 649, 727, 726, 348/64; 358/310; H04N 9/64

[56] References Cited

U.S. PATENT DOCUMENTS

| | | | |
|---|---|---|---|
| 4,167,750 | 9/1979 | Tomimoto et al. | 348/645 |
| 4,679,072 | 7/1987 | Takayama | 348/645 |
| 4,905,077 | 2/1990 | Ishii | 348/564 |
| 5,233,434 | 8/1993 | Furuki et al. | 358/310 |

FOREIGN PATENT DOCUMENTS

| | | | |
|---|---|---|---|
| 47-9406 | of 1972 | Japan . | |
| 132282 | 6/1991 | Japan | H04N 9/64 |
| 4057584 | 2/1992 | Japan | H04N 9/64 |
| 2208460 | 3/1989 | United Kingdom | H04N 9/64 |

OTHER PUBLICATIONS

Product catalog of Leader Electronic Co., "Betacam . . . ", Leader Electronic Measuring Instrument No. 38 91/92, pp. 98 to 101.

Optical disk catalog 91-3 of Matsushita Electronic Industry Co., "Panasonic Human Electronics"(issued on 1 Mar., 1991).

Primary Examiner—James J. Groody
Assistant Examiner—Glenton B. Burgess
Attorney, Agent, or Firm—Antonelli, Terry, Stout & Kraus

[57] ABSTRACT

A color display apparatus for a video information system includes an input for receiving at least one externally applied color component signal, a display device having predetermined color characteristics, and a compensating unit responsive to the at least one externally applied color component signal from the input for compensating at least a portion of the at least one externally applied color component signal in accordance with the predetermined color characteristics of the display device. The display device is responsive to the input and the compensating unit for displaying a color image of the externally applied color component signal.

8 Claims, 5 Drawing Sheets ns having different chromaticities of three primary colors from those of the NTSC broadcasting standard. The display device is driven with the optimum color-difference signals, so that the deterioration of color reproducibility can be prevented.

COLOR DISPLAY APPARATUS HAVING COMPENSATING UNIT

CROSS-REFERENCE TO RELATED APPLICATION

This application is a continuation-in-part application of copending U.S. application Ser. No. 988,667, filed Dec. 10, 1992, for METHOD AND APPARATUS FOR CORRECTING COLOR REPRODUCTION, the subject mater of which is incorporated by reference herein.

BACKGROUND OF THE INVENTION

The present invention relates to a video information system and a display apparatus such as a television receiver or a monitor to which a component signal can be input.

In recent years, various kinds of recording media are found in the market and the kinds of recording systems of video signals are also diversified corresponding to the kinds of the recording media. For example, a recording system with a component signal is one kind. In the system, a video signal is recorded in the form of a component signal, that is, a luminance signal and color-difference signals. An example of a component signal is shown in a product catalog of Leader Electronic Co., Leader Electronic Measuring Instrument No. 38 91/92, pp. 98 to 101. An example of a video recording apparatus with a component signal is shown in an optical disk catalog 91-3 of Matsushita Electronic Industry Co. (issued on 1 Mar., 1991).

In general, in a video recording apparatus, a component signal is chrominance-modulated to obtain a carrier chrominance signal and further it is composed with a luminance signal to form an NTSC signal, and it is supplied to a display apparatus. On the other hand, on the side of the display apparatus, the NTSC signal is separated and demodulated in a reversed process of the above to bring it back to a component signal, and the component signal is displayed as a video signal. In the above operation, surplus processing is included such as: a component signal chrominance modulation composition of a luminance signal and a chrominance signal, an NTSC signal separation into a luminance signal and a chrominance signal, and chrominance demodulation of a component signal, which processing deteriorates the quality of an image. In order to eliminate the surplus processing and prevent the deterioration of picture quality, there will be provided an output of a component signal in a video recording apparatus and an input for a component signal in a display apparatus.

When a video recording apparatus and a display apparatus are connected through a component signal and a display device (for example, a Braun tube or a liquid crystal panel) of the display apparatus is driven with the signal, there occurs a problem that color reproducibility is worse in comparison with that in the case of a composite signal connection. That is, in the case of a general commercial TV receiver or monitor, when an RF signal, an NTSC composite signal, separated signals(a luminance signal and a carrier chrominance signal), etc. are input to the receiver or monitor in the process of demodulation of a carrier chrominance signal into color-difference signals with a chrominance demodulator, different demodulation axes from the demodulation (modulation) axes of the NTSC broadcasting standard are used to obtain optimum color-difference signals suited to the luminance media having different chromaticities of three primary colors from those of the NTSC broadcasting standard. The display device is driven with the optimum color-difference signals, so that the deterioration of color reproducibility can be prevented.

An example of obtaining the optimum color-difference signals are shown in a Japanese Patent Application, Laid-open No. 9406/72 which relates to a method for making a skin color in an image to be displayed be insensitive to the deviation of a chrominance signal (an error caused by the distortion in the phase or amplitude on a transmission path), and it is also effective for the improvement in color reproducibility. Japanese Patent Application No. 350477/91 corresponding to the above-identified copending U.S. application Ser. No. 988,667, filed Dec. 10, 1992 discloses further improvement in color reproducibility.

In the aforementioned disclosures, it is recognized that the xy chromaticity values of phosphors of three primary colors (red, green and blue) of an existing display apparatus are different from those of the NTSC standard, and the color reproduction area of a display apparatus is narrower than that of the NTSC phosphors. Therefore, it is widely known that distortion occurs in the color reproducibility in a displayed image. In particular, the differences in xy chromaticity values of green and red phosphors are large, so that the distortion in color reproducibility in reproduced images occurs in the vicinity of yellow-green, and the colors in the vicinity of yellow-green, that is, skin color and green, are compressed by yellow-green and the color reproduction of these colors is deteriorated as shown in the chromaticity diagram of FIG. 1. The aforementioned disclosures describe methods for improving the color reproduction problem.

The method of correction for color reproduction will be explained with respect to FIGS. 1–3. FIG. 1 shows the distortion in color reproduction caused by the differences between the existing xy chromaticity values of phosphors of three primary colors (red, green and blue) of a display apparatus (without being given the color reproduction correction) and those of the NTSC phosphors. The white circular marks show reproduced colors of the NTSC phosphors and the solid black circular marks show reproduced colors of phosphors of the existing display apparatus. The tip of an arrow mark shows the position of a reproduced color being distorted and a double circle of black and white expresses that the reproduced color is not distorted. The distortion in color reproduction characteristics of a display apparatus occurs in the vicinity of the axis 7 of a yellow-green signal caused by the difference between the color reproduction area 1 formed with the NTSC phosphors and the color reproduction area 2 formed with the phosphors in the existing display apparatus, in particular, caused by the differences in xy chromaticity values of green and red phosphors. Thereby, color reproduction distortion appears in a state where green 3 and skin color 5 are compressed by yellow-green 4.

The above-mentioned color reproduction correction method described in the Japanese Patent, Laid-open No. 9406/72 is a method in which skin color 5 and red 6 which are positioned so as to be compressed in the vicinity of yellow-green axis 7 are made to approach red, and the signals in the vicinity of red and skin color are made to be reproduced in their original areas by widening the demodulation angle between the B-Y axis and the R-Y axis in a chrominance demodulation circuit and further by increasing the demodulation gain of R-Y axis. FIG. 2 shows the result of correction of skin color 5 and red 6. The effect of the correcting direction 8 in color reproduction makes it possible to correct skin color 5 and red 6. With respect to green 3, correction is not possible.

In accordance with a color reproduction correction method, exclusive axes for red and green are provided in place of an R-Y axis of a color demodulation circuit and these axes are selectively used corresponding to the hue of an input signal. Thereby, skin color 5 and red 6 which are compressed in the vicinity of yellow-green axis are made to approach red, and the signals in the vicinity of skin color and red are made to be reproduced in their original areas, and further, green 3 which is compressed in the vicinity of the axis 7 is made to approach green, and the signals in the vicinity of green are made to be reproduced in their original areas. FIG. 3 shows the result of correction of three colors, skin color 5, red 6 and green 3, and the effect of the correcting direction 8 in color reproduction corrects skin color 5 and red 6, and the effect of the correcting direction 9 in color reproduction corrects green 3 in a manner disclosed in copending U.S. application Serial No. 07/988,667. Therefore, by the latter method more kinds of colors can be corrected than those by the former method.

As described above, when a signal is input in the form of a carrier chrominance signal, the deterioration in color reproduction caused by the difference between the xy chromaticity values of three primary colors of luminescent media of a display device and those of the NTSC broadcasting standard can be improved by the interposition of the above-described correction circuit in the process of chrominance demodulation.

When color-difference signals formed according to the NTSC broadcasting standard are input to the display device and the display device is driven by the signals, chrominance demodulation is not needed and the above-mentioned correction circuit is not interpositioned. Therefore, the deterioration in color reproduction caused by the difference between the xy chromaticity values of the three primary colors of the luminescent media of the display device and the xy chromaticity value of the NTSC broadcasting standard comes out without being corrected.

Accordingly, in a case where a video recording apparatus and a display apparatus are connected so as to supply to the display apparatus a component signal, color reproducibility is deteriorated in comparison with the case where an RF signal, an NTSC composite signal, or separated signals (a luminance signal and a carrier chrominance signal) are input. Therefore, there has been a problem that different colors from the original colors are reproduced in a display device.

SUMMARY OF THE INVENTION

It is an object of the present invention to provide a color display apparatus of a color video information system which receives an externally applied color component signal and for properly displaying an image in original colors.

It is another object of the present invention to provide a color display apparatus having a color display device with predetermined color characteristics and a compensating unit for compensating an externally applied color component signal in accordance with the predetermined color characteristics of the display device so as to properly display a color image on the display device.

According to the present invention, a chromaticity converter is provided between a component signal input to the display apparatus and a display device, and the input component signal is converted or compensated so as to provide a signal suited to the chrominance characteristics of the display device.

The chromaticity converter provides an equivalent operation to the correcting operation for the demodulation axis which is interpositioned when the carrier chrominance signal is chrominance-demodulated. The color-difference signals of the component signal are converted to color-difference signals equivalent to the corrected color-difference signals which appear in the corrected output of the chrominance demodulation circuit. Thereby, even in a case where a component signal is input, it is made possible to improve the deterioration in color reproducibility caused by the difference between the xy chrominance values of the three primary colors of the luminescent media of the display device and the xy chrominance values of the three primary colors such as in the NTSC broadcasting standard. The color reproducibility is equivalent to that obtained in a case where a composite signal is input.

These and other objects, features, and advantages of the present invention will become more apparent from the following description when taken in conjunction with the accompanying drawings which show, for purposes of illustration only, several embodiments of the present invention.

DESCRIPTION OF THE PREFERRED EMBODIMENTS

Figure 4:
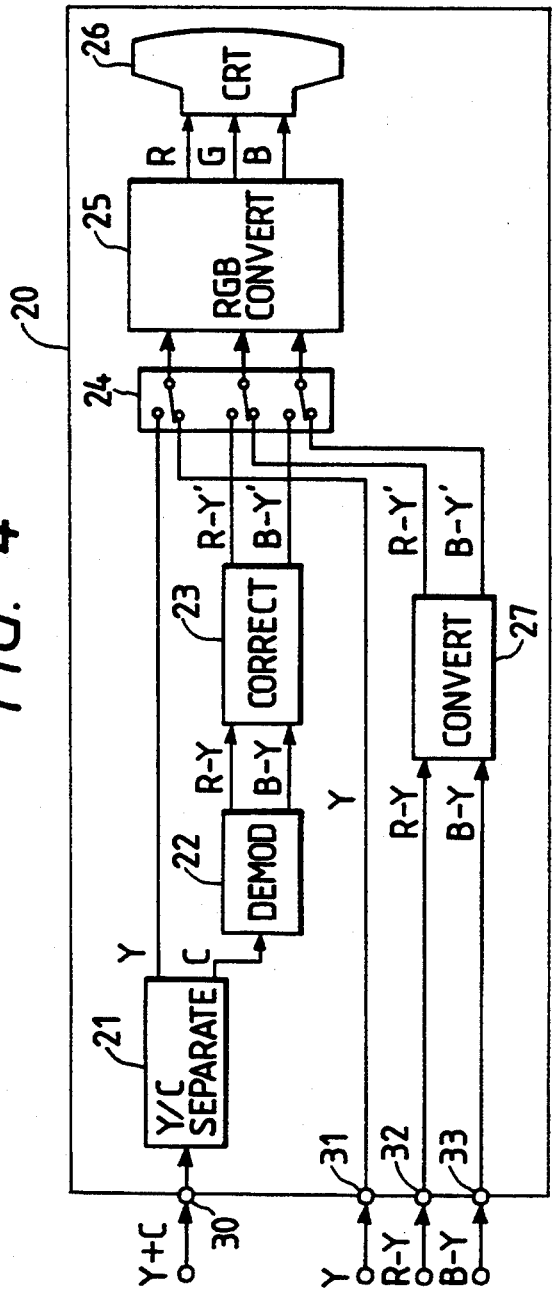
FIG. 4 is a block diagram showing an embodiment according to the present invention.

Referring now to the drawings wherein like reference numerals are utilized to designate like parts throughout the several views, FIG. 4 is a block diagram of an embodiment of a color display apparatus 20 of a color video information system according to the present invention. A color display apparatus 20 includes a separation circuit 21 for separating a luminance signal and a chrominance signal (hereinafter referred to as Y/C separation circuit), a chrominance demodulation circuit 22, a correction circuit 23, a switch circuit 24, an RGB conversion circuit 25, a display 26 (represented herein as a CRT), and a conversion circuit 27. A signal 30 which is composed of a luminance signal and a chrominance signal, that is, an NTSC composite signal (hereinafter referred to as a composite signal), a luminance signal 31 (hereinafter referred to as a Y signal), and chrominance signals in the form of an R-Y signal 32 and a B-Y signal 33 are shown as being input or supplied to the display apparatus. A signal obtained by adding signals 31, 32 and 33 is hereinafter referred to as a component signal and primary color signals are also hereinafter referred to as a component signal.

In FIG. 4, a composite signal 30 input to the display apparatus 20 is separated into a luminance signal (Y signal) and a chrominance signal (C signal) by the separation circuit 21. The C signal is input to the chrominance demodulation circuit 22 and demodulated with a standard demodulation axis of the NTSC broadcasting standard to provide color-difference signals (R-Y signal, B-Y signal) according to the NTSC broadcasting standard. The color-difference signals are supplied to the correction or compensation circuit 23 and are chrominance-converted or compensated to color-difference signals which are suited to the xy chromaticity values of three primary colors of the luminescent materials of the display device as described above, so that the compensated color-difference signals, R-Y' and B-Y', are output. Although, a chrominance demodulation circuit 22 and a correction or compensation circuit 23 are shown as separate circuits for explanatory convenience, it is noted that chrominance converted or compensated color-difference signals, R-Y' and B-Y' are obtainable in the output of a chrominance demodulation circuit by a method in which demodulation is performed in changing the demodulation axis of the demodulation circuit, as described above. In this case, a correction circuit is unnecessary. When a composite signal is selected for the display apparatus 20, a Y signal output from the Y/C separation circuit 21 and the output signals, R-Y' and B-Y' from the correction circuit 23 are input to the RGB conversion circuit 25 through the switch circuit 24 and converted into signals, R, G and B, to drive the display device 26. Up to this point, an ordinary display apparatus of a composite signal input system other than the switch circuit 24 is shown and described.

Next, the case where a component signal composed of a luminance signal (Y signal) 31 and chrominance signals in the form of color-difference signals (R-Y signal 32 and B-Y signal 33) conforming to the NTSC broadcasting standard is directly input to the display apparatus 20 will be explained. The R-Y signal 32 and the B-Y signal 33 are input to a conversion or compensation circuit 27 and are subjected to chrominance conversion or compensation which is equivalent to the conversion by the correction or compensation circuit 23, that is, chrominance-converted or compensated signals, R-Y' and B-Y' are output, which are color-difference signals converted so as to be suited to the xy chromaticity values of three primary colors of the luminescent materials of the display device. When a component signal is selected for the display apparatus 20, the Y signal 31 and the output of the conversion or compensation circuit 27, the R-Y' signal and the B-Y' signal, are input to the RGB conversion circuit 25 through the switch circuit 24 to be converted into R, G and B signals for driving the display device 26.

In the display apparatus 20, the R-Y signal 32 and the B-Y signal 33 contained in the component signal input are subjected to chrominance conversion or compensation which is equivalent to that when a composite signal 30 is input and after conversion the signals drive the display device, so that when a component signal which is input to the display apparatus is displayed, a similar color reproducibility to that obtained when a composite signal which is input to the display apparatus is displayed.

Figure 1:
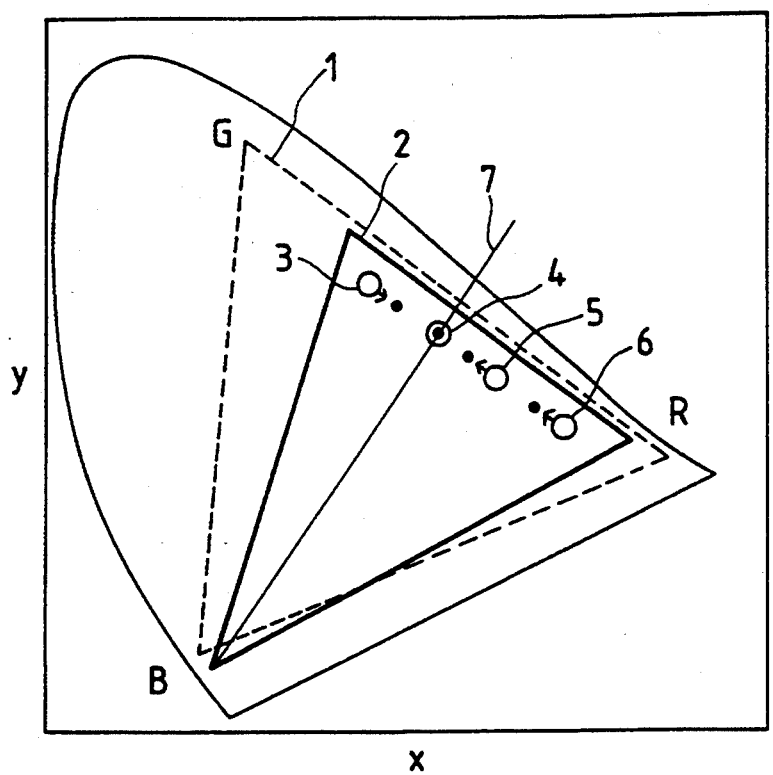
FIG. 1 is a chromaticity diagram showing the distortion in color reproduction generated by the difference between the xy chromaticity values of phosphors of 3 primary colors (red, green and blue) of an existing display apparatus (having no color reproduction correction) and the xy chromaticity values of phosphors of the NTSC system.
Figure 2:
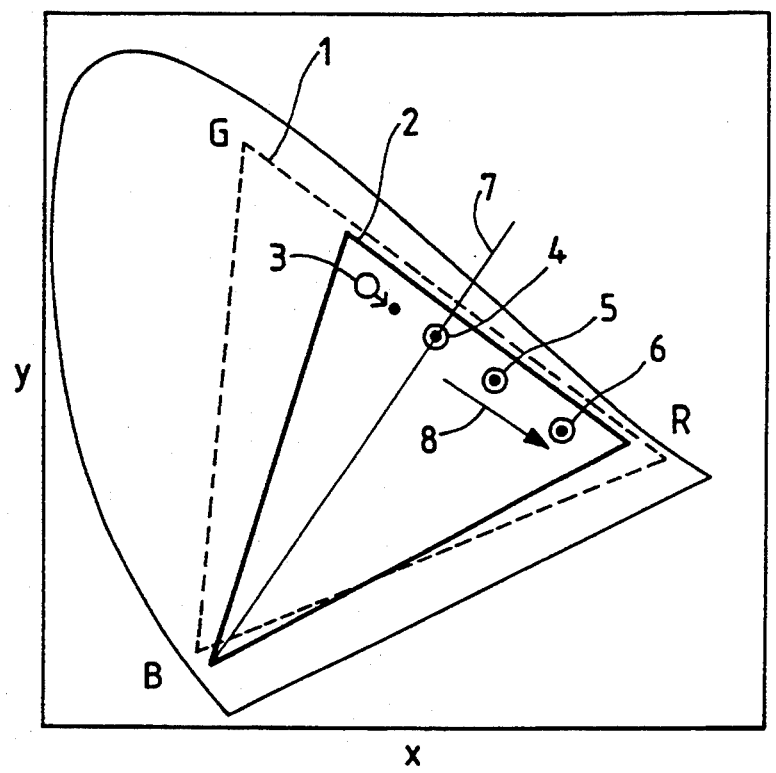
FIG. 2 is a chromaticity diagram showing an effect on the color reproducibility when a conventional color reproduction correction method is applied.
Figure 6:
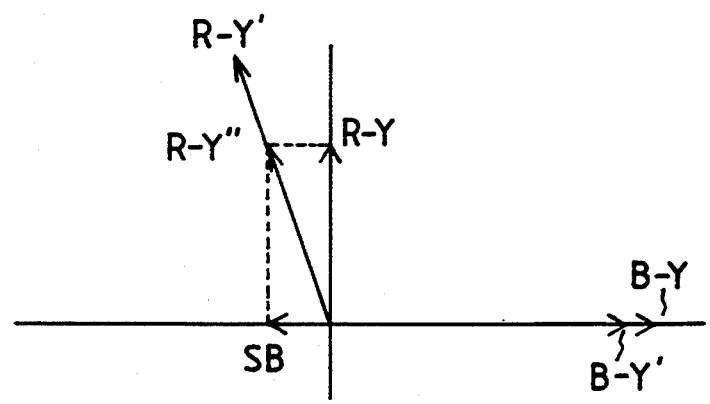
FIG. 6 is a vector diagram corresponding to the conversion circuit of FIG. 5.
Figure 5:
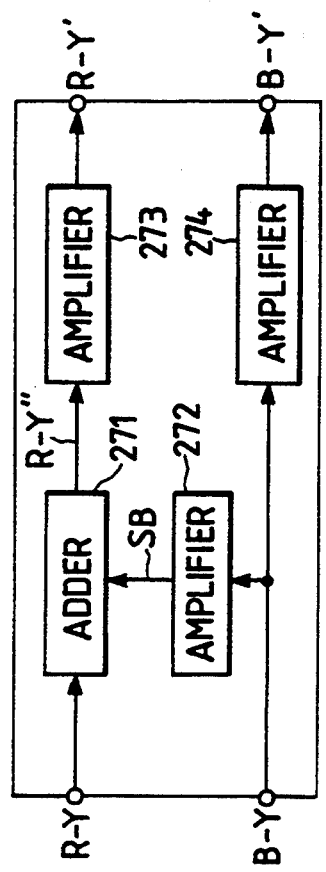
FIG. 5 is a block diagram showing an example of a conversion circuit in accordance with FIG. 4.

An example of a conversion or compensation circuit 27 is illustrated in block diagram form in FIG. 5 and is described in conjunction with the vector diagram of FIG. 6. The block diagram of FIG. 2 represents a conversion or compensation circuit 27 corresponding to the chrominance demodulation circuit 22 and the correction or conversion circuit 23 of FIG. 4 constituted so as to have a wider angle between the chrominance demodulation axes than the angle between the chrominance demodulation axes in the NTSC standard. The conversion or compensation circuit 27 includes an adder 271 and an amplifier 272 as well as amplifiers 273 and 274. The amplifiers 272–274 have a variable gain which is equal to, less than, or greater than 1 and which gain is set in accordance with characteristics of the display device. An R-Y signal and a B-Y signal are color-difference signals having demodulation axes (modulation axes) according to the NTSC broadcasting standard in which the R-Y axis and the B-Y axis form a right angle between them as shown in FIG. 6. The B-Y signal is input to the amplifier 272 for application to adder 271, and is also input to amplifier 274 and becomes a B-Y' signal at the output of the conversion circuit 27. The amplifier 272 is, in this case, a reversal amplifier with a gain set to be less than 1. The adder 271 adds an R-Y signal and the output of the amplifier 272 and outputs an R-Y" signal to the amplifier 273 which provides a R-Y' signal at the output of the compensation circuit 27. The vector diagrams for the signals are shown in FIG. 6 and, as is apparent, are dependent on the gains of the amplifier.

Now, considering the demodulation axes of the signals, R-Y' and B-Y', a vector when the output of B-Y axis is passed through the amplifier 272 becomes SB shown in FIG. 6, and when SB is added to the signal in the R-Y axis in the adder 271, a vector in the R-Y" axis is obtained and, upon amplification, by amplifier 274, a vector of the R-Y' axis is obtained, as shown in FIG. 6. The vectors of an R-Y axis and a B-Y axis in the input are converted to the vectors of an R-Y' axis and a B-Y' axis, so that the demodulation axes of the output of the compensation circuit 27, i.e., an R-Y' signal and a B-Y' signal, are equivalent to those obtained in the case where the carrier chrominance signal is chrominance-demodulated by widening the chrominance demodulation angle. Further, the demodulation gain of the R-Y axis is also increased.

Figure 3:
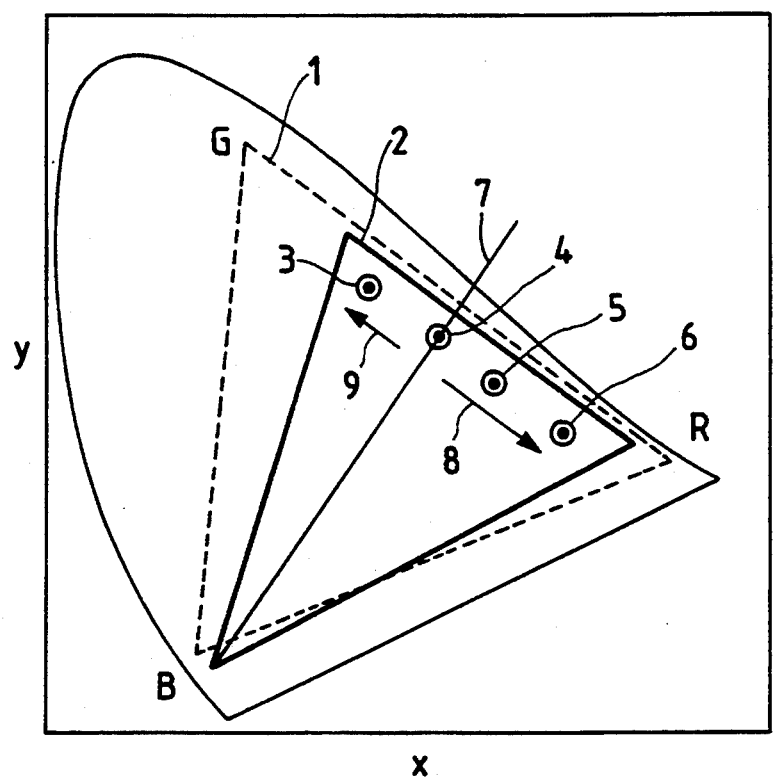
FIG. 3 is a chromaticity diagram showing an effect on the color reproducibility when another color reproduction correction method as disclosed in copending U.S. application Serial No. 07/988,667 is applied.
Figure 7:
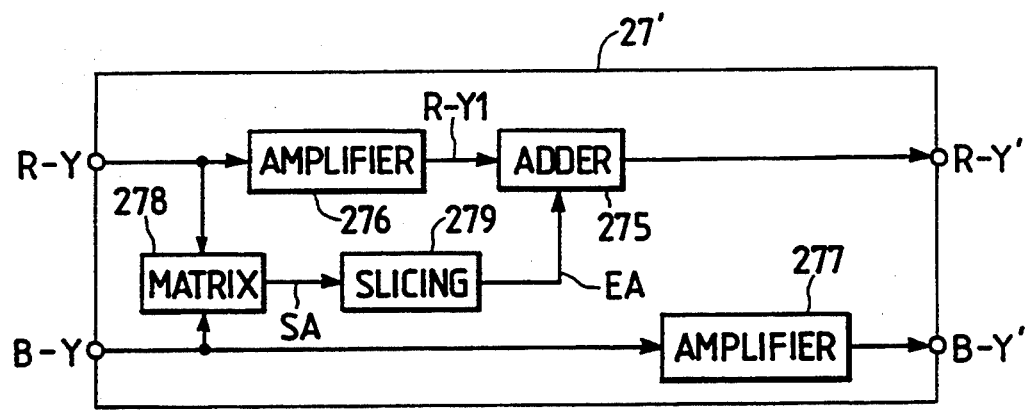
FIG. 7 is a block diagram showing another example of a conversion circuit in accordance with FIG. 4.

Another example of a conversion or compensation circuit 27' will be explained referring to a block diagram shown in FIG. 7 and a vector diagram shown in FIG. 8. The block diagram shown in FIG. 7 is a conversion or compensation circuit 27' corresponding to the chrominance demodulation circuit 22 and the correction or compensation circuit 23 shown in FIG. 4, as in a conventional technique, as shown in FIG. 3, for the improvement of chrominance reproducibility, wherein exclusive axes for red and green are respectively provided in place of an R-Y axis of a chrominance demodulation circuit and these exclusive axes are selectively used according to the hue of an input signal. In FIG. 7, the compensation circuit includes an adder 275, amplifiers 276 and 277, a matrix circuit 278 and a slicing circuit 279. Here again, the amplifiers have a variable gain.

In FIG. 7, an R-Y signal and a B-Y signal formed according to the NTSC broadcasting standard are input to a display apparatus and supplied to the matrix circuit 278, and the R-Y signal is also supplied to the amplifier 276 and the R-Y demodulation axis is amplified to R-Y1. The B-Y signal is supplied to the amplifier 277 and is output as a B-Y' signal. In the matrix circuit 278, as shown in FIG. 8, the R-Y signal and the B-Y signal are matrix-processed and a demodulation axis SA is produced to be used as a corrector for producing an R-Y2 axis. The vector loci of positive and negative of the output signal of the matrix circuit 278 are shown in FIG. 8 as circles, EA and −EA, having the diameters of vector axes. The output signal of the matrix circuit 278 is supplied to the slicing circuit 279 and only the positive component (vector locus EA) is extracted. The output of the slicing circuit 279 is supplied to the adder 275 and added reversely to the output of the amplifier 276, which is an amplified signal of the R-Y signal.

Figure 8:
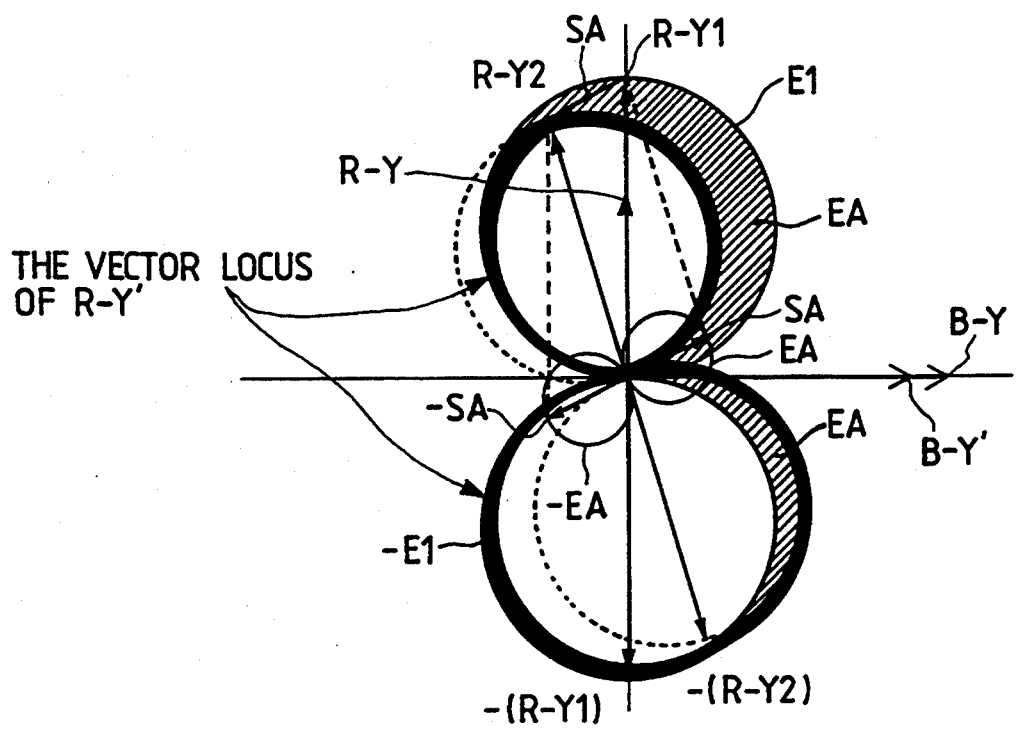
FIG. 8 is a vector diagram corresponding to the conversion circuit of FIG. 7.

Referring to FIG. 8, as described above, the signals of demodulation axes, SA and −SA, can be obtained in the matrix circuit 278. When the vector loci, E1 and −E1, of the demodulation axis R-Y1 are added to the vector loci, EA and −EA, of the demodulation axis SA, the vector loci of the demodulation axis R-Y2 can be obtained. In this case, only the positive component of the output signal of the matrix circuit 278, a processed result of the demodulation axis SA, (the vector locus EA) is extracted by the slicing circuit 279, and the vector locus EA is added reversely in the adder 276 to the amplified signal of the R-Y signal by the amplifier 276. Because of this, the vector locus EA is equivalent to the hatched parts of the vector loci, E1 and −E1, of the R-Y1 axis, so that only these parts are subtracted. Therefore, only the vector loci in the hatched phase-ranges become the vector loci of the R-Y2 axis, and as a result, the vector loci of the R-Y' axis become the loci shown in heavy lines where R-Y' is given by the following equation $$R - Y = R - Y1 \ldots (R - Y1 \leq R - Y2)$$
$$R - Y2 \ldots (R - Y1 > R - Y2)$$

The present construction has the equivalent effect as that when the exclusive axes for red and green are provided in place of R-Y axis in the chrominance demodulation circuit and these axes are selectively used according to the hue of the input signal.

Figure 9:
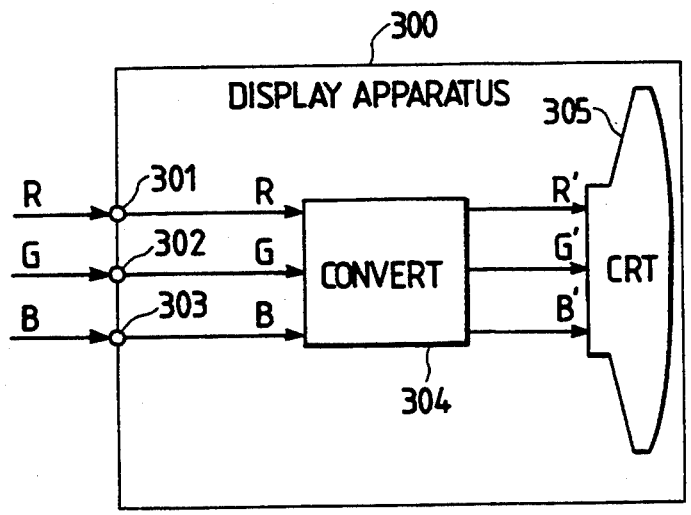
FIG. 9 is a block diagram showing another embodiment according to the present invention.

FIG. 9 is a block diagram of another embodiment of a display apparatus according to the present invention wherein a component signal in the form of signals of the three primary colors an R signal 301, a G signal 302 and a B signal 303 are input to the display apparatus 300. The display apparatus is provided with a conversion circuit 304 and a display device 305 in the form of a CRT. In FIG. 9, the R signal 301, G signal 302 and the B signal 303 input to the display apparatus 300 are input to the conversion circuit 304 and subjected to chrominance conversion or compensation. That is, chrominance-converted or compensated signals R', B' and G' are output from the compensation circuit 304 and which are the three primary color signals converted so as to be suited to the xy chromaticity values of three primary colors of the luminescent materials of the display device 305. The display device 305 is driven by R', B' and G' signals output from the compensation circuit 304.

Figure 10:
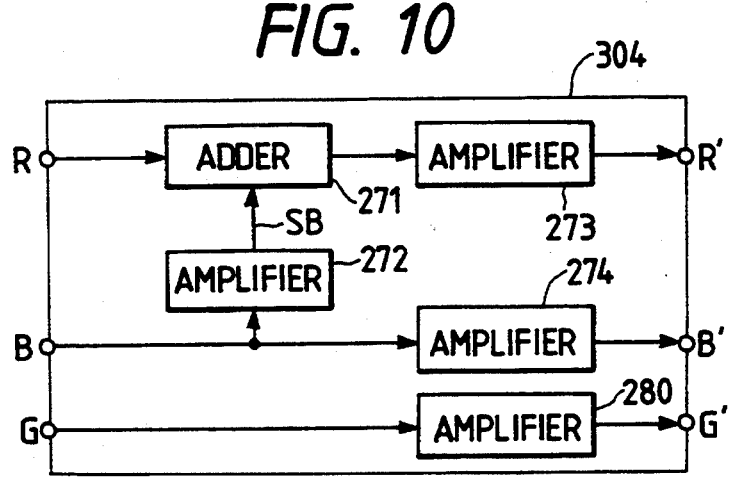
FIG. 10 is a block diagram showing an example of a conversion circuit in accordance with FIG. 9.

An example of a compensation circuit 304 will be described with reference to a block diagram of FIG. 10. FIG. 10 is similar to FIG. 5 with the R-Y signal and B-Y signal in FIG. 5 replaced by the R signal and B signal in FIG. 10 and there is also provided a G signal in accordance with the following equations $$R \text{ (input)} = (R-Y) + Y$$

$$B \text{ (input)} = (B-Y) + Y$$

$$G \text{ (input)} = (G-Y) + Y$$

The process of converting or compensating from the R signal and the B signal to the R' signal and the B' signal in FIG. 10 is equivalent to the process of converting or compensating the R-Y signal and the B-Y signal to R-Y' signal and B-Y' signal in FIG. 5 so that the adder and amplifiers have been identified with the same reference numerals and a corresponding amplifier 280 is provided for the G signal so as to output the G' signal.

Figure 11:
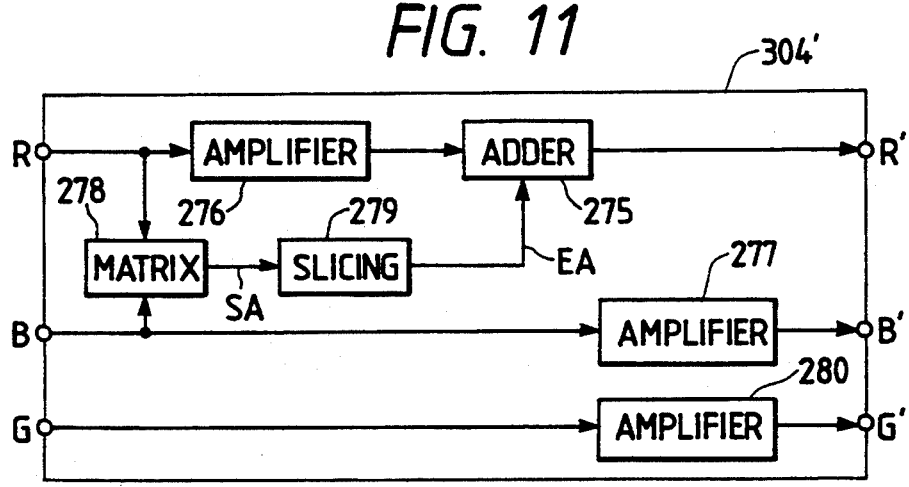
FIG. 11 is a block diagram showing another example of a conversion circuit in accordance with FIG. 9.

FIG. 11 shows another example of a conversion or compensation circuit 304' in block diagram form corresponding to FIG. 7 with the R-Y signal and B-Y signal in FIG. 7 being replaced by the R signal and B signal in FIG. 11. Further, as in FIG. 10 an amplifier 280 is provided for the G signal so as to output the G' signal. The conversion circuit operates in the manner described above with respect to FIG. 7.

The examples of the conversion or compensation circuit 27, 27', 304 and 304' described above correspond in operation to that of the correction or compensation circuit 23 provided for the purpose of converting or compensating the chromaticities of an R-Y signal and a B-Y signal in a component signal input including primary color signal input so as to be suited to the chromaticity characteristics of a display device of the display apparatus. When the characteristics of a correction circuit are changed, those of a conversion circuit will be also changed correspondingly.

In a display apparatus having a composite signal input and a component signal input for the display apparatus, the color reproducibility for the component signal including the primary color signal input of the same order as obtained for the composite signal can be obtained.

Even when the display apparatus 20 or 300 has an input of an RF signal or an input of separated signals (S), the signals are processed through the chrominance demodulation circuit 22 and the correction or compensation circuit 23, and further even when a component signal input such as a primary color signal input is added to the above inputs, such a defect that the chromaticities among the above-mentioned cases are not equal can be avoided by providing the conversion circuit as described.

In the case of a display apparatus having a component signal input such as a primary color signal input only, the color reproducibility for a component signal or primary color signal can be improved by providing the conversion circuit as described.

In the above explanation, it is assumed that a component signal is input to the display apparatus 20 in a three-wire system having the format of signals, Y, R-Y and B-Y, that is, the three-wire system of a luminance signal 31 (Y signal) and color-difference signals (R-Y signal 32 and B-Y signal 33) as shown previously in the publicly disclosed example (catalog of products of Leader Electronic Inc.). However, the present invention is also applicable to a two-wire system. When the input of a component signal is of a two-wire system in a format in which the R-Y signal and B-Y signal are multiplexed into Y-CTDM (Y-CTCM), etc., a separation circuit for separating the R-Y signal and the B-Y signal will be provided before the conversion circuit. Also as described above, the present invention is applicable to primary color signal input.

According to the present invention, when a display apparatus is provided with a function of a component signal input or primary color signal input, the color reproducibility of a video signal displayed on a display device is improved. It is also possible to adjust the chromaticity of an input signal, even when a signal other than a component signal is input to the display apparatus.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A color display apparatus comprising:
   first input means for receiving at least one externally applied color component signal;
   a display device having predetermined color characteristics; and
   a compensating unit responsive to the at least one externally applied color component signal from the input means for compensating at least a portion of the at least one externally applied color component signal in accordance with the predetermined color characteristics of the display device;
   the display device being responsive to the first input means and the compensating unit for displaying a color image of the at least one externally applied color component signal;
   wherein the predetermined color characteristics of the display device include luminous media having different chromaticities for three primary colors, the compensating unit compensating the component color signal for substantially cancelling an error in reproduced chromaticity caused by differences in the chromaticities of the three primary colors from each other, wherein the color component signal includes a luminance signal and chrominance signals, and wherein the compensating unit includes a matrix unit for receiving the chrominance signals, for matrixing the chrominance signals and for generating new chrominance signals having new demodulation axes, a slicing unit for extracting only one of a positive component and a negative component of the new chrominance signals and providing an output thereof, and an adder for adding the output of the slicing unit and of the chrominance signals.

2. A color display apparatus according to claim 1, further comprising at least a first amplifier for amplifying one of the chrominance signals, the output of the first amplifier being supplied to the adder so that the adder adds the output of the first amplifier and the output of the slicing unit and provides the added output as an output of the compensating unit.

3. A color display apparatus according to claim 2, further comprising a second amplifier for amplifying an other of the chrominance signals and providing an amplified output as another output of the compensating unit.

4. A color display apparatus according to claim 3, wherein the first and second amplifiers have a variable gain.

5. A color display apparatus according to claim 1, wherein the chrominance signals are color-difference signals.

6. A color display apparatus comprising:
   first input means for receiving at least one externally applied color component signal;
   a display device having predetermined color characteristics; and
   a compensating unit responsive to the at least one externally applied color component signal from the input means for compensating at least a portion of the at least one externally applied color component signal in accordance with the predetermined color characteristics of the display device;
   the display device being responsive to the first input means and the compensating unit for displaying a color image of the at least one externally applied color component signal;
   wherein the predetermined color characteristics of the display device include luminous media having different chromaticities for three primary colors, the compensating unit compensating the component color signal for substantially cancelling an error in reproduced chromaticity caused by differences in the chromaticities of the three primary colors from each other, wherein the component signal comprises three primary color signals, wherein the compensating unit compensates each of the three primary color signals, and wherein the compensating unit includes a matrix unit for receiving two of three primary color signals, for matrixing the primary signals and for generating new primary color signals having new demodulation axes, a slicing unit for extracting only one of a positive component and a negative component of the new primary color signals and providing an output thereof, and an adder for adding the output of the slicing unit and one of the two primary color signals.

7. A color display apparatus according to claim 6, further comprising a first amplifier for amplifying the one of the two primary color signals, the output of the first amplifier being supplied to the adder so that the adder adds the output of the first amplifier and output of the slicing unit and provides the added output as a first output of the compensating unit, a second amplifier for amplifying the other of the two primary color signals and providing an amplified output as a second output of the compensating unit, and a third amplifier for amplifying he third primary color signal and providing an amplified output as third output of the compensating unit.

8. A color display apparatus according to claim 7, wherein the second and third outputs are amplified outputs of B and G primary colors.

* * * * *